(12) United States Patent
Castaneda et al.

(10) Patent No.: US 9,995,173 B2
(45) Date of Patent: Jun. 12, 2018

(54) DUCTING PLATFORM COVER PLATE

(71) Applicant: United Technologies Corporation, Hartford, CT (US)

(72) Inventors: Pedro L. Castaneda, Manchester, CT (US); Edward F. Pietraszkiewicz, Southington, CT (US); Rafael A. Perez, Arecibo, PR (US); Nestor A. Alvarez, Isabela, PR (US); Seth J. Thomen, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 394 days.

(21) Appl. No.: 14/924,369

(22) Filed: Oct. 27, 2015

(65) Prior Publication Data

US 2016/0047271 A1 Feb. 18, 2016

Related U.S. Application Data

(63) Continuation of application No. PCT/US2014/042976, filed on Jun. 18, 2014.

(60) Provisional application No. 61/867,981, filed on Aug. 20, 2013.

(51) Int. Cl.
*F01D 25/12* (2006.01)
*F01D 9/04* (2006.01)
*F01D 9/06* (2006.01)

(52) U.S. Cl.
CPC ............. *F01D 25/12* (2013.01); *F01D 9/041* (2013.01); *F01D 9/065* (2013.01); *F05D 2220/30* (2013.01); *F05D 2240/81* (2013.01); *F05D 2260/20* (2013.01); *F05D 2260/202* (2013.01); *F05D 2260/205* (2013.01); *F05D 2260/22141* (2013.01); *Y02T 50/676* (2013.01)

(58) Field of Classification Search
CPC ....... F01D 9/065; F01D 25/12; F05D 2240/81
See application file for complete search history.

(56) References Cited

U.S. PATENT DOCUMENTS

| 4,693,667 A * | 9/1987 | Lenz ........................ F01D 5/189 415/115 |
| 6,254,333 B1 | 7/2001 | Merry |
| 6,309,175 B1 * | 10/2001 | Hahnle ................... F01D 5/187 415/115 |

(Continued)

OTHER PUBLICATIONS

International Search Report and Written Opinion dated Oct. 29, 2014 in Application No. PCT/US2014/042976.

(Continued)

*Primary Examiner* — Woody Lee, Jr.
*Assistant Examiner* — Brian O Peters
(74) *Attorney, Agent, or Firm* — Snell & Wilmer, L.L.P.

(57) ABSTRACT

The present disclosure relates to cooling systems for turbine stators. A stator may include a vane platform. A ducting plate may be coupled to the vane platform. The ducting plate and the vane platform may form a cooling chamber between the ducting plate and the vane platform. The ducting plate may include an inlet adjacent to a leading edge of the vane platform. The vane platform may include an outlet adjacent to a trailing edge of the vane platform. The ducting plate may be configured to channel cooling air through the cooling chamber from the leading edge to the trailing edge.

15 Claims, 4 Drawing Sheets

(56) References Cited

U.S. PATENT DOCUMENTS

| | | | |
|---|---|---|---|
| 8,016,546 B2* | 9/2011 | Surace | F01D 5/187 |
| | | | 415/115 |
| 8,714,909 B2* | 5/2014 | Propheter-Hinckley | |
| | | | F01D 9/041 |
| | | | 415/115 |
| 9,909,439 B2* | 3/2018 | Bluck | F01D 11/006 |
| 2007/0297916 A1 | 12/2007 | Levine et al. | |
| 2009/0028692 A1 | 1/2009 | Surace et al. | |
| 2012/0163975 A1 | 6/2012 | Propheter-Hinckley | |

OTHER PUBLICATIONS

International Preliminary Report on Patentability dated 02/23/2016 in Application No. PCT/US2014/042976.

* cited by examiner

DUCTING PLATFORM COVER PLATE

CROSS-REFERENCE TO RELATED APPLICATIONS

This application is a continuation of, claims priority to and the benefit of, PCT/US2014/042976 filed on Jun. 18, 2014 and entitled "DUCTING PLATFORM COVER PLATE," which claims priority from U.S. Provisional Application No. 61/867,981 filed on Aug. 20, 2013 and entitled "DUCTING PLATFORM COVER PLATE." Both of the aforementioned applications are incorporated herein by reference in their entirety.

FIELD OF INVENTION

The present disclosure relates generally to turbine engines. More particularly, the present disclosure relates to systems for cooling turbine engine components.

BACKGROUND OF THE INVENTION

Gas turbine engines, such as those used in electrical power generation or used in modern aircraft, typically include a compressor, a combustion section, and a turbine. The combustion section may expel high temperature hot gases through the turbine. Turbine components may be subjected to thermal stress from the high temperature hot gases.

SUMMARY OF THE INVENTION

According to various embodiments, a stator is disclosed. The stator may include a vane platform having an outer surface. An outlet may be located adjacent to a trailing edge of the vane platform. The stator may further include a ducting plate coupled to the vane platform. The ducting plate and the vane platform may form a cooling chamber between the ducting plate and the outer surface of the vane platform. The ducting plate may include an inlet adjacent to a leading edge of the vane platform. In various embodiments, the inlet may be located between the leading edge and the ducting plate. The ducting plate may direct cooling air from the inlet adjacent to the leading edge to the outlet adjacent to the trailing edge. In various embodiments, the inlet may comprise a single opening.

According to various embodiments, a system for cooling turbine vane platforms is disclosed. The system may include a stator having a vane platform. The stator may include a ducting plate coupled to the vane platform. The vane platform and the ducting plate may form a cooling chamber between the vane platform and the ducting plate. The system may further include a compressor configured to supply cooling air to an inlet to the cooling chamber. The inlet may be located adjacent to a leading edge of the vane platform. The cooling chamber may be configured to direct the cooling air from the leading edge to the trailing edge.

According to various embodiments, a stator platform is disclosed. The stator platform may include an outer surface. The stator platform may further include a ducting plate coupled to the outer surface. In various embodiments, the ducting plate may comprise only one inlet. The ducting plate may be configured to transmit cooling air from the inlet to an outlet in the outer surface. The inlet may be located adjacent to a leading edge of the stator platform, and the outlet may be located adjacent to a trailing edge of the stator platform. The ducting plate may be configured to accelerate the cooling air from the inlet to the outlet.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
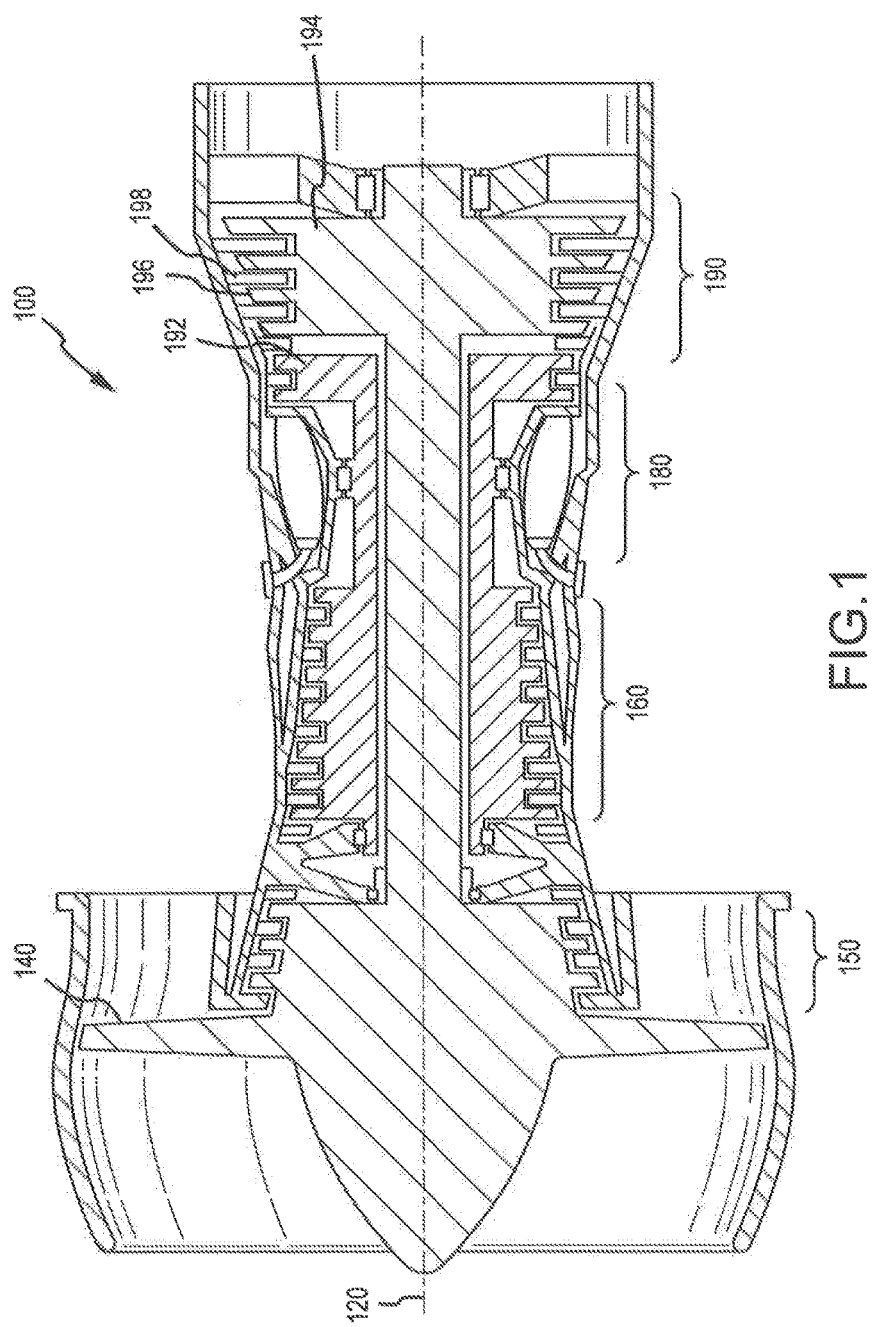
FIG. 1 illustrates a schematic axial cross-section view showing a of a gas turbine engine according to various embodiments of the disclosure.

Referring to FIG. 1, a gas turbine engine 100, such as a turbofan gas turbine engine, is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
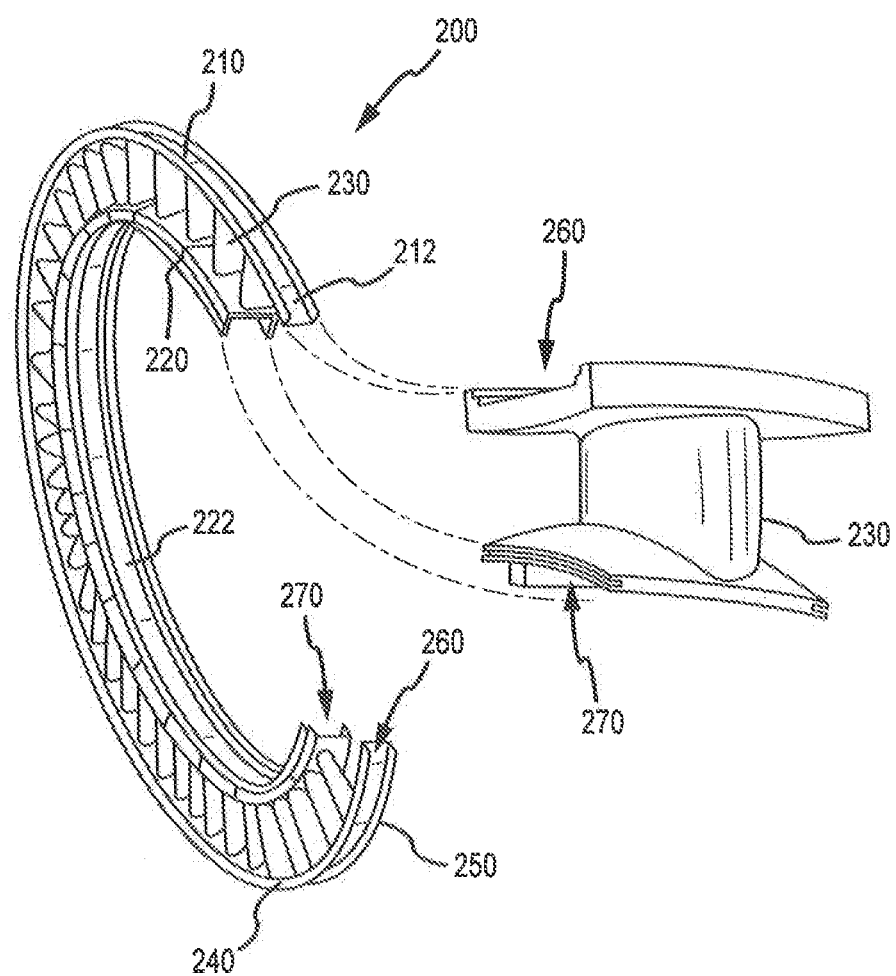
FIG. 2 illustrates a perspective view of a portion of a stator which can be used in a gas turbine engine according to various embodiments.

Referring to FIG. 2, a portion of a stator 200 is illustrated according to various embodiments. Stator 200 may comprise an outer vane platform 210 and an inner vane platform 220 radially spaced apart from each other. In various embodiments, outer vane platform 210 may form a portion of an outer core engine structure, and inner vane platform 220 may form a portion of an inner core engine structure to at least partially define an annular turbine nozzle core gas flow path. Stator 200 may comprise a plurality of vanes 230 disposed between outer vane platform 210 and inner vane platform 220. A single vane 230 is illustrated removed from stator 200 and rotated 90° for illustrative purposes.

In various embodiments, vanes 230, outer vane platform 210, and inner vane platform 220 may be subjected to high temperatures from hot gases coming from combustion section 180. Hot gases may enter stator 200 at leading edge 240 and may exit stator 200 at trailing edge 250. In various embodiments, the hot gases may be between 2500° F.-2700° F. (1370° C.-1480° C.), and in various embodiments, the hot gases may be between 2000° F.-3000° F. (1090° C.-1650° C.). The temperature of the hot gases may vary depending on the engine being used and the operating level of the engine. The high temperature of the hot gases may cause thermally driven stress on vanes 230, outer vane platform 210, and inner vane platform 220. The stress may be greatest on a leading edge 240 of stator 200, and least on a trailing edge 250, as temperatures and pressures may be greater at leading edge 240 than trailing edge 250.

In various embodiments, cooling air may be directed to outer vane platform 210 and inner vane platform 220 to counteract the thermally driven stress from the hot gases. In various embodiments, the cooling air may be supplied by compressors 150, 160 of gas turbine engine 100. However, in various embodiments, the cooling air may be supplied by a compressor which is not a component of gas turbine engine 100. As used herein, cooling air refers to any air which is at a temperature lower than the temperature of the hot gases. For example, in various embodiments, a temperature of the cooling air coming from the compressor may be between 800° F.-1200° F. (430° C.-650° C.), or in various embodiments a temperature of the cooling air may be between 500° F.-1500F (260° C.-820° C.). Additionally, the cooling air may be pressurized by the compressor. For example, in various embodiments the cooling air may be pressurized to between 150 psi-200 psi (1030 kPa-1380 kPa), or between 50 psi-300 psi (340 kPa-2070 kPa). The high pressure may allow a large amount of cooling air to be directed to outer vane platform 210 and inner vane platform 220.

In various embodiments, the cooling air may be directed into at least one of outer platform cooling chamber 260 and inner platform cooling chamber 270. In various embodiments, both outer platform cooling chamber 260 and inner platform cooling chamber 270 may be present in stator 200. However, in various embodiments, only outer platform cooling chamber 260 or inner platform cooling chamber 270 may be present in stator 200. Outer platform cooling chamber 260 may be adjacent to an outer surface 212 of outer vane platform 210, and inner platform cooling chamber 270 may be adjacent to outer surface 222 of inner vane platform 220. The cooling air may contact outer surface 212 and outer surface 222, and heat may be transferred from outer vane platform 210 and/or inner vane platform 220 to the cooling air. Thus, the cooling air may lower the operating temperature of outer vane platform 210 and inner vane platform 220. In various embodiments, heat may transfer from vanes 230 through outer vane platform 210 and/or inner vane platform 220 to the cooling air, thus the cooling air may also lower the operating temperature of vanes 230.

Figure 3:
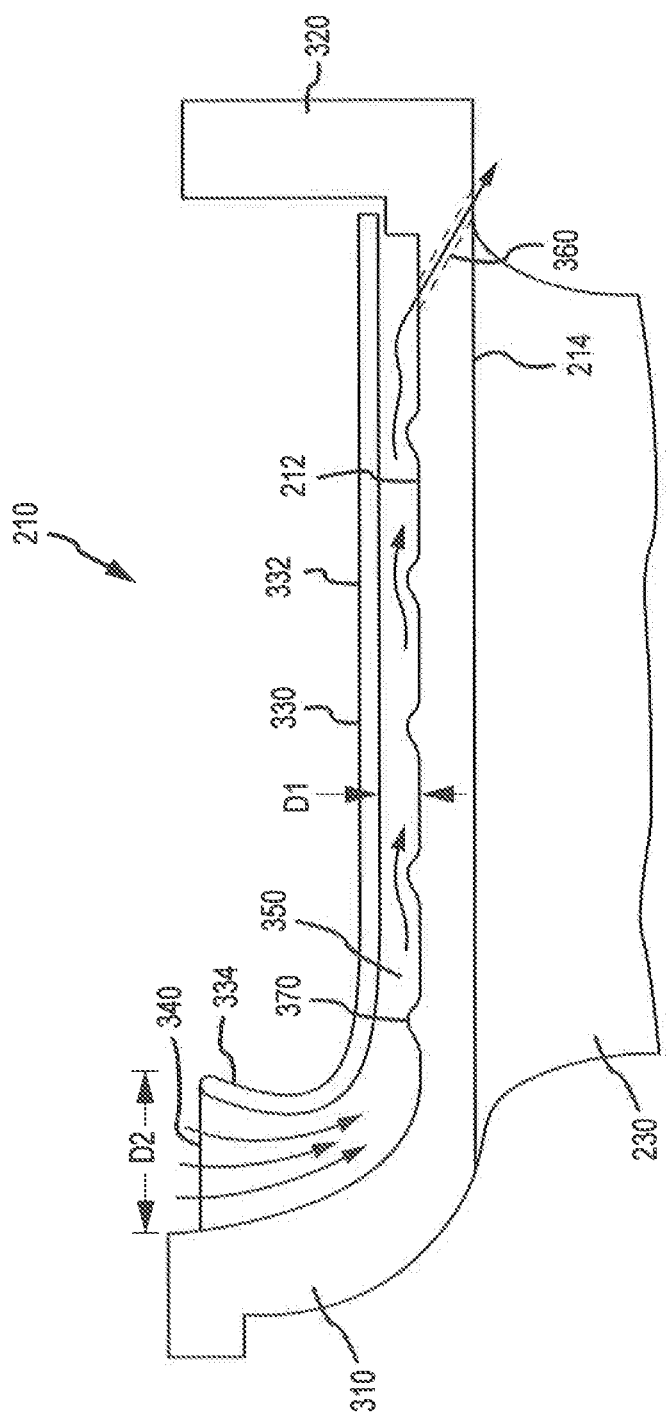
FIG. 3 illustrates a cross-section view of an outer vane platform according to various embodiments.

Referring to FIG. 3, a cross-section of an outer vane platform 210 is illustrated according to various embodiments. Outer vane platform 210 may comprise leading edge 310, trailing edge 320, outer surface 212, and ducting plate 330. Ducting plate 330 and leading edge 310 may define an inlet 340 to cooling chamber 350. Inlet 340 may be located adjacent to leading edge 310. Thus, in various embodiments, the full mass of the cooling air may be directed to leading edge 310 prior to travelling through cooling chamber 350. The cooling air may flow in a direction from leading edge 310 to trailing edge 320 through cooling chamber 350, and the cooling air may exit through outlet 360 in outer vane platform 210. Outlet 360 may be disposed aft of vane 230, and/or adjacent to trailing edge 320. With the exception of inlet 340 and outlet 360, in various embodiments cooling chamber 350 may be hermetically sealed or substantially sealed to prevent fluid communication with surrounding fluids. Thus, in various embodiments, the only air exchange in cooling chamber 350 may occur through inlet 340 and outlet 360.

In various embodiments, ducting plate 330 may be coupled to outer vane platform 210. In various embodiments, ducting plate 330 may be welded, bolted, riveted, attached with a high temperature adhesive, or coupled to outer vane platform 210 by any other method capable of withstanding high temperatures. Ducting plate 330 and outer vane platform 210 may form cooling chamber 350. In various embodiments, a distance D1 between ducting plate 330 and outer surface 212 may be about 0.100 inches (0.254 cm) in the area of cooling chamber 350. However, in various embodiments, the distance D1 between ducting plate 330 and outer surface 212 may be about 0.010 inches-0.250 inches (0.0254 cm-0.635 cm). The distance D1 between ducting plate 330 and outer surface 212 may vary based on the engine type and the desired cooling properties. In various embodiments, ducting plate 330 may comprise a cooling chamber portion 332 and an inlet portion 334. In various embodiments, inlet portion 334 may be bent at an angle relative to cooling chamber portion 332, such that inlet portion 334 is non-parallel relative to cooling chamber portion 332. In various embodiments, inlet portion 334 may be curved, however, in various embodiments, inlet portion 334 may be substantially straight and disposed at an angle relative to cooling chamber portion 332. For example, in various embodiments, inlet portion 334 may be substantially parallel to leading edge 310, or in various embodiments, inlet portion 334 may diverge from leading edge 310 such that a distance between inlet portion 334 and leading edge 310 is greater at inlet 340 than a distance between inlet portion 334 and leading edge 310 where inlet portion 334 meets cooling chamber portion 332. In various embodiments, a distance D2 between inlet portion 334 and leading edge 310 may be greater than the distance D1 between cooling chamber portion 332 and outer surface 212.

In various embodiments, outer vane platform 210 may comprise one ducting plate 330 corresponding to each vane 230. However, in various embodiments, an outer vane platform may comprise a single ducting plate which circumscribes the outer vane platform, or an outer vane platform may comprise any number of ducting plates. Ducting plate 330 may comprise any material capable of withstanding high temperatures. For example, in various embodiments, ducting plate 330 may comprise steel or a nickel alloy.

Inlet 340 may comprise a variety of shapes. In various embodiments, inlet 340 may comprise a single elongated opening adjacent to leading edge 310 extending from a first edge of ducting plate 330 to a second edge of ducting plate 330. However, in various embodiments, an inlet may comprise a plurality of openings in ducting plate 330 adjacent to leading edge 310, or in various embodiments, an inlet may comprise a single circular opening in ducting plate 330. In various embodiments, at least a portion of inlet 340 may be defined by leading edge 310. However, in various embodiments, inlet 340 is defined solely by ducting plate 330 and located adjacent to leading edge 310, with a portion of ducting plate 330 separating inlet 340 and leading edge 310.

Similarly, outlet 360 may comprise a plurality of shapes. Outlet 360 may comprise a single elongated opening, a plurality of openings, or a single circular opening. In various embodiments, outlet 360 may extend between outer surface 212 to and inner surface 214 of outer vane platform 210. However, in various embodiments, outlet 360 may extend through trailing edge 320 or through ducting plate 330 adjacent to trailing edge 320.

In various embodiments, a cross-sectional area of inlet 340 relative to a direction of flow of the cooling air may be greater than a cross-sectional area of cooling chamber 350 relative to a direction of flow of the cooling air, and/or a cross-sectional area of outlet 360 relative to a direction of flow of the cooling air. For example, in various embodiments, a ratio of the cross-sectional area of inlet 340 to the cross-sectional area of outlet 360 may be about 2-1, or between 1.5-1 and 4-1. Thus, the cooling air may accelerate as the cooling air travels through inlet 340, into cooling chamber 350, and out outlet 360. The increased velocity of the cooling air may result in the cooling air in cooling chamber 350 being replaced by new cooling air at a faster rate, which may allow more heat to be transferred from outer vane platform 210 to the cooling air.

In various embodiments, as the cooling air flows through cooling chamber 350, heat may be transferred from outer surface 212 to the cooling air. Thus, the cooling air may increase in temperature as it flows through cooling chamber 350. The cooling air may be at the lowest temperature at inlet 340, and at its highest temperature at outlet 360. For example, in various embodiments, a temperature of the cooling air may be at 800° F. (430° C.) at inlet 340, and a temperature of the cooling air may increase to 1500° F. (820° C.) at outlet 360. Thus, the cooling air may provide the greatest cooling effect at leading edge 310. This may act to at least partially counteract heat absorption from the hot gases.

In various embodiments, outer surface 212 of outer vane platform 210 may comprise heat transfer enhancement features such as surface dimples 370 or trip strips. In various embodiments, surface dimples 370 may increase a surface area of outer surface 212 which is in contact with the cooling air, as opposed to a flat surface of outer surface 212. The greater surface area may promote heat transfer between outer vane platform 210 and the cooling air. Additionally, the surface dimples may disrupt laminar air flow throughout cooling chamber 350. This may promote heat transfer between outer vane platform 310 and the cooling air by increasing the percentage of cooling air flowing through cooling chamber 350 which makes contact with outer surface 212. In various embodiments, a height of dimples 370 may be about 10% of the distance D1 between outer surface 212 and ducting plate 330, and in various embodiments a height of dimples 370 may be about 5% to 20% of the distance D1 between outer surface 212 and ducting plate 330.

In various embodiments, at least one of outer surface 212 and ducting plate 330 may comprise trip strips. The trip strips may be located at an angle relative to outer surface 212, such as at 45 degrees relative to outer surface 212, or from 30-90 degrees relative to outer surface 212. The trip strips may cause turbulence in the cooling air moving through the cooling chamber, which may increase heat transfer from outer surface 212 to the cooling air. Trip strips are further described in Levine et al., U.S. Patent Publication No. 2007/0297916, entitled, "Leading Edge Cooling Using Wrapped Staggered-Chevron Trip Strips," the contents of which are herein incorporated by reference in their entirety.

Figure 4:
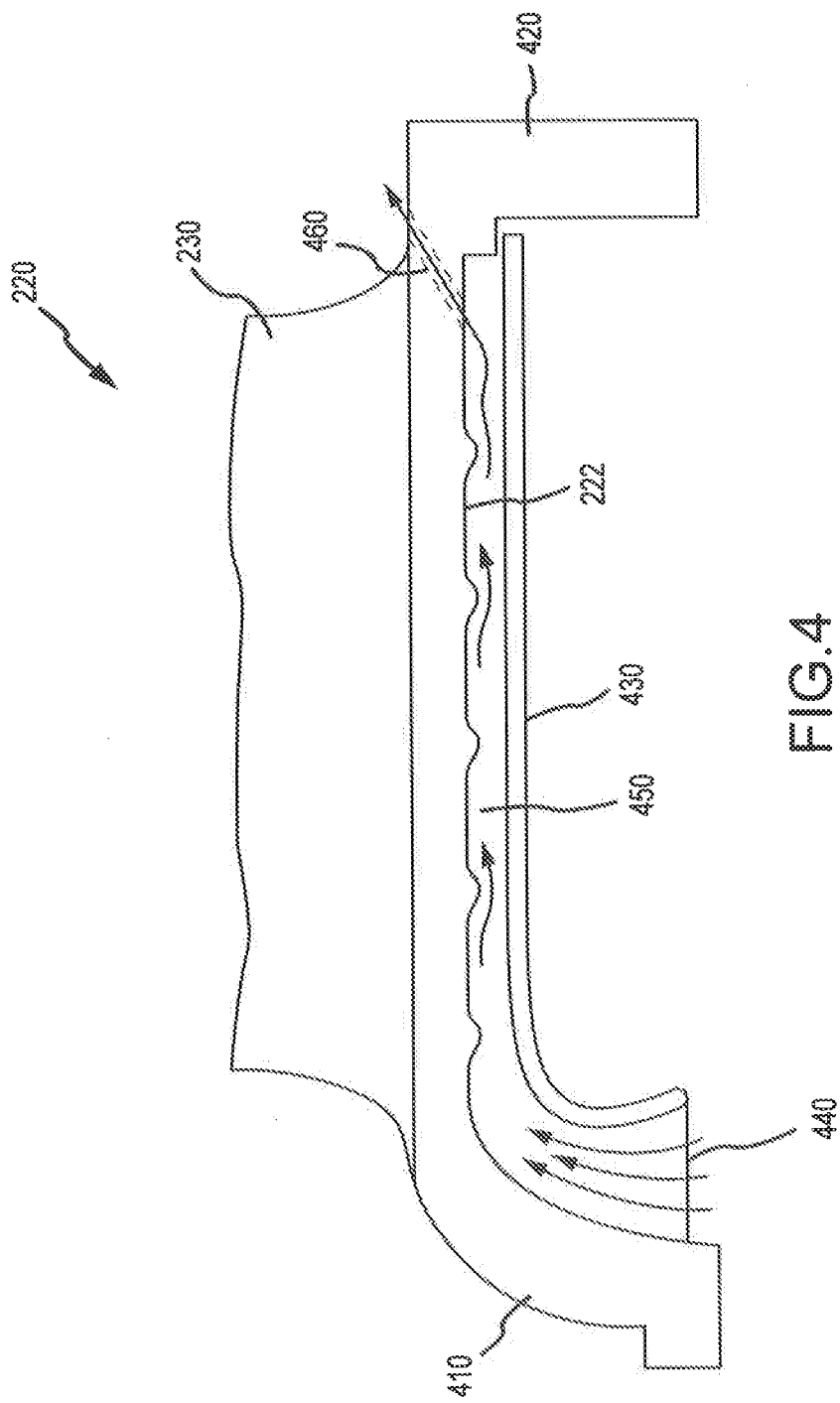
FIG. 4 illustrates a cross-section view of an inner vane platform according to various embodiments.

Referring to FIG. 4, a cross-section of an inner vane platform 220 is illustrated according to various embodiments. Similarly to outer vane platform 210, inner vane platform 220 may comprise leading edge 410, trailing edge 420, outer surface 222, and ducting plate 430. Ducting plate 430 and leading edge 410 may define an inlet 440 to cooling chamber 350. Inlet 440 may be located adjacent to leading edge 410. Ducting plate 430 and outer surface 222 may form cooling chamber 450. Cooling air may enter inlet 440, through cooling chamber 450, and may exit through outlet 460.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching may be used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator comprising:
   a stationary vane platform defining an annular body having an outer surface; and
   a ducting plate coupled to the vane platform, wherein the ducting plate and the vane platform form a cooling chamber between the ducting plate and the outer surface, and wherein the ducting plate forms an inlet with a leading edge of the vane platform.

2. The stator of claim 1, wherein the cooling chamber is hermetically sealed further comprises an outlet formed by the ducting plate and the vane platform.

3. The stator of claim 2, wherein the outlet extends between the outer surface and an inner surface of the vane platform.

4. The stator of claim 1, wherein the outer surface comprises at least one of a plurality of dimples and a plurality of trip strips.

5. The stator of claim 1, further comprising a plurality of ducting plates, wherein each ducting plate corresponds to a vane.

6. The stator of claim 1, wherein the inlet comprises a plurality of openings.

7. The stator of claim 1, wherein the inlet comprises a single opening.

8. The stator of claim 1, wherein the ducting plate comprises a cooling chamber portion and an inlet portion, and wherein the inlet portion is non-parallel relative to the cooling chamber portion.

9. A system for cooling turbine vane platforms comprising:
   a stator having a stationary vane platform defining an annular body and a ducting plate coupled to the vane platform, wherein the vane platform and the ducting plate form a cooling chamber between the vane platform and the ducting plate; and
   a compressor configured to supply cooling air to an inlet to the cooling chamber, the inlet formed by the ducting plate and a leading edge of the vane platform.

10. The system of claim 9, wherein the ducting plate prevents cooling air from entering the cooling chamber at locations other than the inlet.

11. The system of claim 9, wherein the vane platform comprises an outlet located adjacent to a trailing edge of the vane platform.

12. The system of claim 9, wherein the cooling chamber is configured to direct the cooling air from the leading edge to a trailing edge.

13. A stator platform comprising:
   a stationary outer surface defining an annular body; and
   a ducting plate coupled to the outer surface, wherein the ducting plate forms an inlet with a leading edge of the stator platform, and wherein the ducting plate is configured to transmit cooling air from the inlet to an outlet in the outer surface.

14. The stator platform in of claim 13, wherein the outer surface comprises at least one of a plurality of dimples and a plurality of trip strips.

15. The stator platform of claim 13, wherein the ducting plate is configured to accelerate the cooling air from the inlet to the outlet.

* * * * *